United States Patent
Asselin et al.

(10) Patent No.: US 9,477,458 B2
(45) Date of Patent: Oct. 25, 2016

(54) DYNAMIC TIMEOUT DETERMINATION FOR MICROCONTROLLER MANAGEMENT OF FIRMWARE UPDATES

(71) Applicant: International Business Machines Corporation, Armonk, NY (US)

(72) Inventors: Albert A. Asselin, Morrisville, NC (US); Michael H. Nolterieke, Raleigh, NC (US); David Roberts, Cary, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 341 days.

(21) Appl. No.: 13/728,139

(22) Filed: Dec. 27, 2012

(65) Prior Publication Data

US 2014/0189669 A1    Jul. 3, 2014

(51) Int. Cl.
*G06F 9/445*     (2006.01)
*G06F 11/14*     (2006.01)

(52) U.S. Cl.
CPC ............ *G06F 8/65* (2013.01); *G06F 11/1433* (2013.01)

(58) Field of Classification Search
None
See application file for complete search history.

(56) References Cited

U.S. PATENT DOCUMENTS

| | | | |
|---|---|---|---|
| 6,874,069 B2* | 3/2005 | Lin | G06F 12/1433 326/8 |
| 8,601,170 B1* | 12/2013 | Marr et al. | 710/8 |
| 2005/0186952 A1* | 8/2005 | Kitajima | 455/419 |
| 2009/0089567 A1* | 4/2009 | Boland et al. | 713/2 |
| 2009/0254897 A1* | 10/2009 | Segalov | 717/173 |
| 2011/0239189 A1* | 9/2011 | Attalla | 717/121 |

\* cited by examiner

*Primary Examiner* — Li B Zhen
*Assistant Examiner* — Amir Soltanzadeh
(74) *Attorney, Agent, or Firm* — Steven M. Greenberg, Esq.; CRGO Law

(57) ABSTRACT

Embodiments of the invention provide a method, system and computer program product for dynamic time out determination during a microcontroller driven firmware update. In an embodiment, the method includes selecting by a processor of a server a firmware update to be applied by a microcontroller to firmware of the server and computing a timeout value according to a function based upon a date of production of the server. The method also includes transmitting a request to the microcontroller to apply the selected firmware update to the firmware. Finally, the method includes determining a failure state responsive to detecting a lapse in time from the request beyond the timeout value without response by the microcontroller.

8 Claims, 1 Drawing Sheet

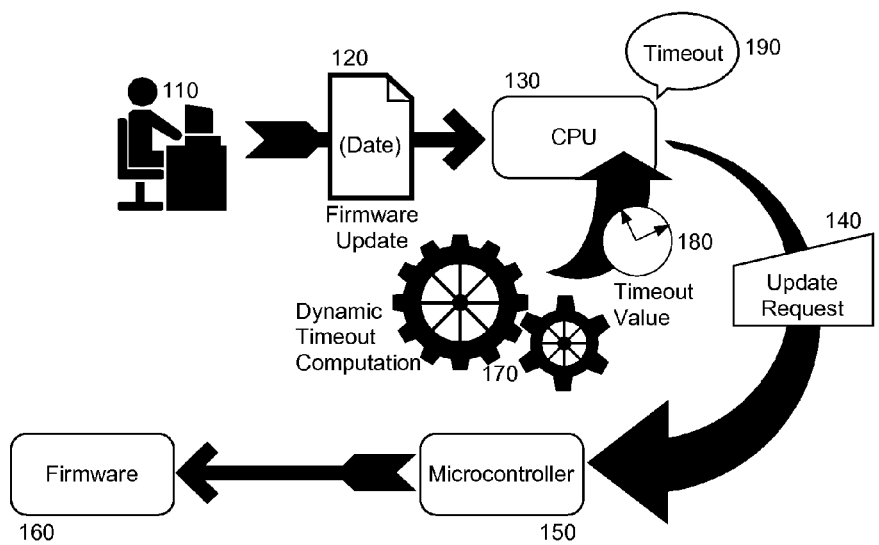
FIG. 1
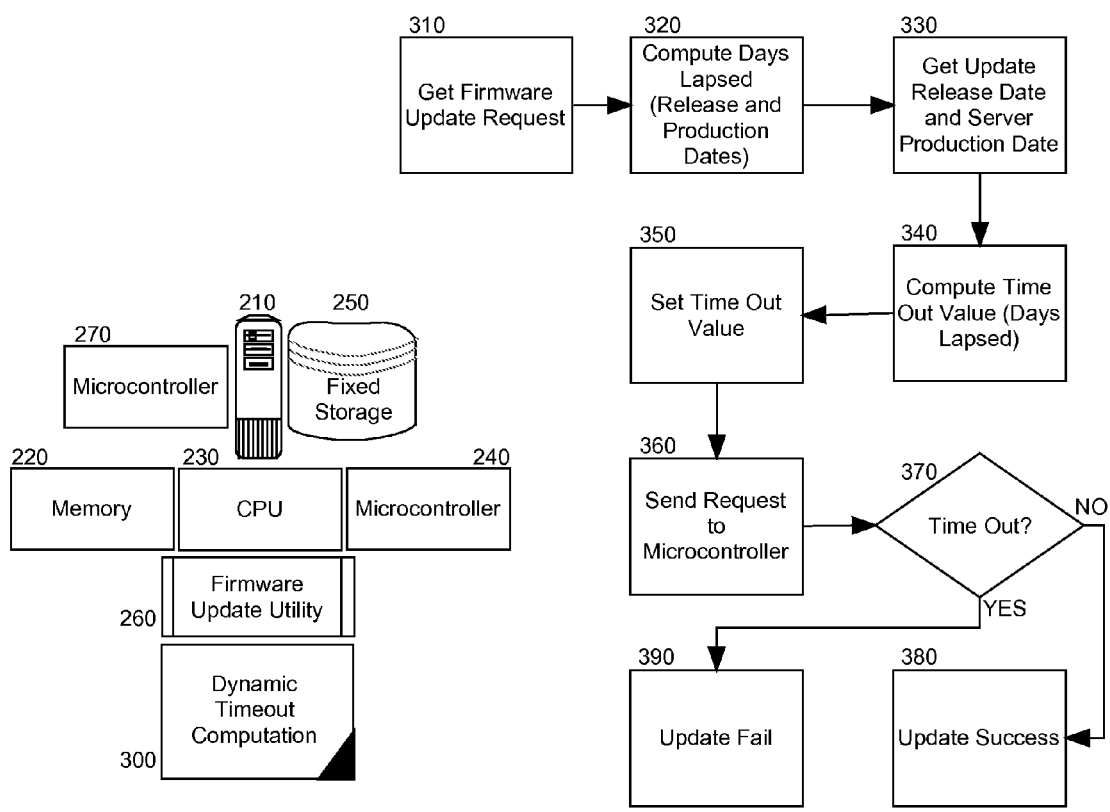
FIG. 2
FIG. 3

US 9,477,458 B2

DYNAMIC TIMEOUT DETERMINATION FOR MICROCONTROLLER MANAGEMENT OF FIRMWARE UPDATES

BACKGROUND OF THE INVENTION

1. Field of the Invention

The present invention relates to firmware updates and more particularly to timeout determination in microcontroller managed firmware updates.

2. Description of the Related Art

In electronic systems and computing, firmware is the combination of persistent memory and program code and data stored therein. Typical examples of devices which utilize firmware include embedded systems, computers, computer peripherals, mobile phones, and digital cameras. The firmware contained in these devices provides the initial control program for the device and is often referred to as a read only memory (ROM) basic input output system (BIOS). As such, firmware typically is stored within non-volatile memory devices such as ROM, erasable programmable ROM (EPROM), or flash memory. Though firmware often is never updated during the lifetime of the host device, in many instances firmware can be updated through a firmware update process.

Common reasons for updating firmware include bug fixes and the addition of new features and functionality to the host device. In the circumstance where the firmware is stored in a fixed medium such as a ROM, updating the firmware can require the physical removal and substituting of the ROM with a new ROM. In contrast, in the circumstance where the firmware is stored in an erasable and reprogrammable medium such as a FLASH or EEPROM storage medium, the storage medium can be reprogrammed utilizing a proprietary update procedure. Generally, the proprietary update procedure can be manually driven with an end user invoking a small utility program. More advanced procedures can be automated and managed remotely from over a computer communications network such as the global Internet.

Historically, firmware updating in a server environment typically had been managed by the central processing unit (CPU) of the server. More recent server architectures incorporate a microcontroller as the driving processor during the update process and the CPU directing the microcontroller to execute the updating of server firmware. In many instances, the microcontroller is included as part of a communications based component of the server such as the network interface card (NIC). Where the microcontroller is included as part of a different component of the server, the microcontroller can be tasked with performing different operations aside from driving the updating of firmware in the server. Thus, the responsiveness of the microcontroller to a request to update the firmware can vary depending upon the operational state of the microcontroller.

Commonly, to account for potential delays in the responsiveness of a microcontroller in updating the firmware, a "built in" time out can be hard coded into the logic for managing a request directed to the microcontroller to update of the firmware. Yet, while the time out value can be appropriate at the time of initially deploying the server, over time, the time out value can become less relevant—especially as added functionality in the microcontroller results in a higher, more intense state of operation of the microcontroller. In the past, the need to adjust the time out value has been addressed through a re-coding of the logic for managing the request directed to the microcontroller to update the firmware. The value to be assigned to the time out is determined by issuing a test request to the microcontroller and measuring the delay in receiving a response from the microcontroller.

BRIEF SUMMARY OF THE INVENTION

Embodiments of the present invention address deficiencies of the art in respect to updating firmware in a server environment and provide a novel and non-obvious method, system and computer program product for dynamic time out determination during a microcontroller driven firmware update. In an embodiment of the invention, a method for dynamic timeout computation during a microcontroller driven firmware update is provided. The method includes selecting by a processor of a server a firmware update to be applied by a microcontroller to firmware of the server and computing a timeout value according to a function based upon a date of production of the server. The method also includes transmitting a request to the microcontroller to apply the selected firmware update to the firmware. Finally, the method includes determining a failure state responsive to detecting a lapse in time from the request beyond the timeout value without response by the microcontroller.

In one aspect of the embodiment, the timeout value is determined according to a function based upon a difference between a date of production of the server and a date of release of the firmware update. In another aspect of the embodiment, the timeout value is determined according to a function based upon a difference between a date of production of the server and a current date. In yet another aspect of the embodiment, the request is transmitted by a firmware update utility executing in memory of the server by the processor of the server.

In another embodiment of the invention, a server data processing system is provided. The system includes a server with a processor, memory, firmware and a microcontroller configured to apply firmware updates to the firmware responsive to a request by the processor. The server also includes a firmware update utility executing in the memory of the server by the processor of the server. Finally, the server includes a dynamic timeout computation module also executing in the memory of the server by the processor of the server. The module includes program code enabled to select a firmware update to be applied to the firmware, compute a timeout value according to a function based upon a date of production of the server, transmit a request to the microcontroller to apply the selected firmware update to the firmware, and to determine a failure state responsive to detecting a lapse in time from the request beyond the timeout value without response by the microcontroller.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for dynamic time out determination during a microcontroller driven firmware update;

FIG. 2 is a schematic illustration of a server data processing system configured for dynamic time out determination during a microcontroller driven firmware update; and, FIG. 3 is a flow chart illustrating a process for dynamic time out determination during a microcontroller driven firmware update.

DETAILED DESCRIPTION OF THE INVENTION

Embodiments of the invention provide for dynamic time out determination during a microcontroller driven firmware update. In accordance with an embodiment of the invention, a firmware update can be selected in a central processing unit (CPU) of a server for application to firmware of the server by a microcontroller disposed within the server. A time out value can be computed for the microcontroller to respond to a request to update the firmware with the firmware update. In this regard, the time out value can be computed as a function of the date of production of the server, for example as a number of days that have lapsed between the date of production of the server and either a current date or a date of the firmware update. Thereafter, a request to apply the firmware update to the firmware can be forwarded to the microcontroller and in the event that a period of time lapses past the computed time out, a failure status can be returned to a requestor of the firmware update.

In further illustration, FIG. 1 pictorially shows a process for dynamic time out determination during a microcontroller driven firmware update. As shown in FIG. 1, an end user 110 can direct the processor 130 of a server (not shown) to apply a firmware update 120 to firmware 160. Dynamic time out computation logic 170 can compute a time out value 180 as a function of a date of production of the server. Thereafter, the processor 130 can issue a request 140 to a microcontroller 150 in the server to apply the firmware update 120 to the firmware 160. To the extent that a period of time lapses from the time of the request 140 which exceeds the timeout value 180, a failure status 190 can be provided.

The process described in connection with FIG. 1 can be implemented within a server data processing system. In yet further illustration, FIG. 2 schematically illustrates of a server data processing system configured for dynamic time out determination during a microcontroller driven firmware update. The system can include a server 210 that includes memory 220, a CPU 230, fixed storage 250 and firmware, such as a ROM BIOS. A microcontroller 240 also can be included within the server 210, for example as part of a NIC (not shown). A firmware update utility 260 can execute in the memory 220 of the server 210 so as to provide computer instructions to apply a firmware update to firmware 270.

Dynamic timeout computation module 300 can be coupled to the firmware update utility 260. The module 300 can include program code enabled upon execution in the memory 220 of the server 210, to dynamically compute a timeout value beyond which a request to apply a firmware update to the firmware 270 is determined to have failed. In this regard, the program code of the module 300 can be enabled to compute the timeout value as a function of the production date of the server 210. For example, the program code of the module 300 can be enabled to compute a timeout value as the difference between a release date of the firmware update and a production date of the server 210, or as the difference between a date contemporaneous to a request to apply the firmware update and the production date of the server 210.

In either circumstance, once the time out value has been computed, a request to apply the firmware update can be provided by the firmware update utility 260 to the microcontroller 240. To the extent that a period of time has lapsed from the request to apply the firmware update that exceeds the computed time out value, a failure condition can be provided. Otherwise, the application of the firmware update to the firmware 270 can be considered a success.

In even yet further illustration of the operation of the dynamic time out computation module 300, FIG. 3 is a flow chart illustrating a process for dynamic time out determination during a microcontroller driven firmware update. Beginning in block 310, a firmware update request can be received. In block 320, a release date for the firmware update along with a production date for the server can be retrieved and in block 330, a number of days that have lapsed between the production date and the release date can be determined. Subsequently, a time out value can be computed based upon the determined number of days that have lapsed in block 340 and a time out value for requesting an application of the firmware update of the microcontroller can be set in block 350.

In block 360, a request can be transmitted to the microcontroller to apply the firmware update to the firmware of the server. In decision block 370 it can be determined whether or not a time out condition has arisen based upon the computed time out value. If not, the firmware update can be considered a success in block 380. Otherwise in block 390 a state of failure in respect to the firmware update can be declared.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for dynamic timeout computation during a microcontroller driven firmware update, the method comprising:

selecting by a processor of a server a firmware update to be applied by a microcontroller to firmware of the server;

computing by the processor a timeout value according to a function based upon a difference between a date of production of the server and a date of release of the firmware update;

transmitting by the processor a request to the microcontroller to apply the selected firmware update to the firmware; and, determining by the processor a failure state responsive to the processor detecting a lapse in time from the request beyond the timeout value without response to the processor by the microcontroller.

2. The method of claim 1, wherein the request is transmitted by a firmware update utility executing iii memory of the server by the processor of the server.

3. The method of claim 1, wherein the microcontroller is included as part of a network interface card (NIC).

4. A server data processing system comprising:
   a server with a processor, memory, firmware and a microcontroller configured to apply firmware updates to the firmware responsive to a request by the processor;
   a firmware update utility executing in the memory of the server by the processor of the server; and,
   a dynamic timeout computation module also executing in the memory of the server by the processor of the server, the module comprising program code enabled to select by the processor a firmware update to be applied to the firmware by the microcontroller, compute a timeout value by the processor according to a function based upon based upon a difference between a date of production of the server and a date of release of the firmware update, transmit by the processor a request to the microcontroller to apply the selected firmware update to the firmware, and to determine by the processor a failure state responsive to the processor detecting a lapse in time from the request beyond the timeout value without response to the processor by the microcontroller.

5. The system of claim 4, wherein the microcontroller is included as part of a network interface card (NIC) disposed in the server.

6. A computer program product for dynamic timeout computation during a microcontroller driven Firmware update, the computer program product comprising:
   a computer readable storage medium comprising a storage device having computer readable program code embodied therewith, the computer readable program code comprising:
   computer readable program code for selecting by a processor of a server a firmware update to the applied by a microcontroller to firmware of the server;
   computer readable program code for computing by the processor a timeout value according to a function based upon a difference between a date of production of the server and a date of release of the firmware update;
   computer readable program code for transmitting by the processor a request to the microcontroller to apply the selected firmware update to the firmware; and,
   computer readable program code for determining by the processor a failure state responsive to detecting by the processor a lapse in time from the request beyond the timeout value without response to the processor by the microcontroller.

7. The computer program product of claim 6, wherein the request is transmitted by a firmware update utility executing in memory of the server by the processor of the server.

8. The computer program product of claim 6, wherein the microcontroller is included as part of a network interface card (NIC).

* * * * *